United States Patent [19]

Hamada et al.

[11] 4,183,287

[45] Jan. 15, 1980

[54] HYDRAULIC CONTROL APPARATUS FOR TRACTOR

[75] Inventors: Toshihiko Hamada; Shiro Okuda, both of Sakai, Japan

[73] Assignee: Kubota Tekko Co., Ltd., Osaka, Japan

[21] Appl. No.: 837,038

[22] Filed: Sep. 27, 1977

Related U.S. Application Data

[63] Continuation-in-part of Ser. No. 620,321, Oct. 7, 1975, abandoned.

[30] Foreign Application Priority Data

Feb. 22, 1975 [JP] Japan ............................... 50-22321
Jun. 23, 1975 [JP] Japan ........................... 50-87717[U]
Jun. 23, 1975 [JP] Japan ........................... 50-87718[U]

[51] Int. Cl.² ........................ F15B 9/10; F15B 13/06
[52] U.S. Cl. ........................ 91/384; 91/448; 91/536
[58] Field of Search ..................... 91/384, 508, 536

[56] References Cited

U.S. PATENT DOCUMENTS

| | | | |
|---|---|---|---|
| 3,156,156 | 11/1964 | Peras | 91/384 |
| 3,205,788 | 9/1965 | Limbrick | 91/384 |
| 3,322,040 | 5/1967 | McRae | 91/384 |

*Primary Examiner*—Paul E. Maslousky
*Attorney, Agent, or Firm*—Armstrong, Nikaido, Marmelstein & Kubovcik

[57] ABSTRACT

A position control valve provided for controlling a first hydraulic unit is also operable to control a second hydraulic unit. The apparatus comprises the first hydraulic unit for raising and lowering a primary working implement, the second hydraulic unit for raising and lowering a secondary working implement, the control valve for controlling the first hydraulic unit, and a feedback mechanism for returning the control valve to its neutral position for every position of a control lever in operative relation to the upward or downward movement of the primary working implement. A guide plate for the control lever for operating the control valve provides a second operation range for the secondary working implement having a neutral position corresponding to a maximum lift position for the primary working implement. Elastic regulating means is mounted on the guide plate for the second operation range to set the control lever in position. The control lever is automatically and accurately returnable to the neutral position when operated against the elastic means and thereafter released from the hand.

3 Claims, 10 Drawing Figures

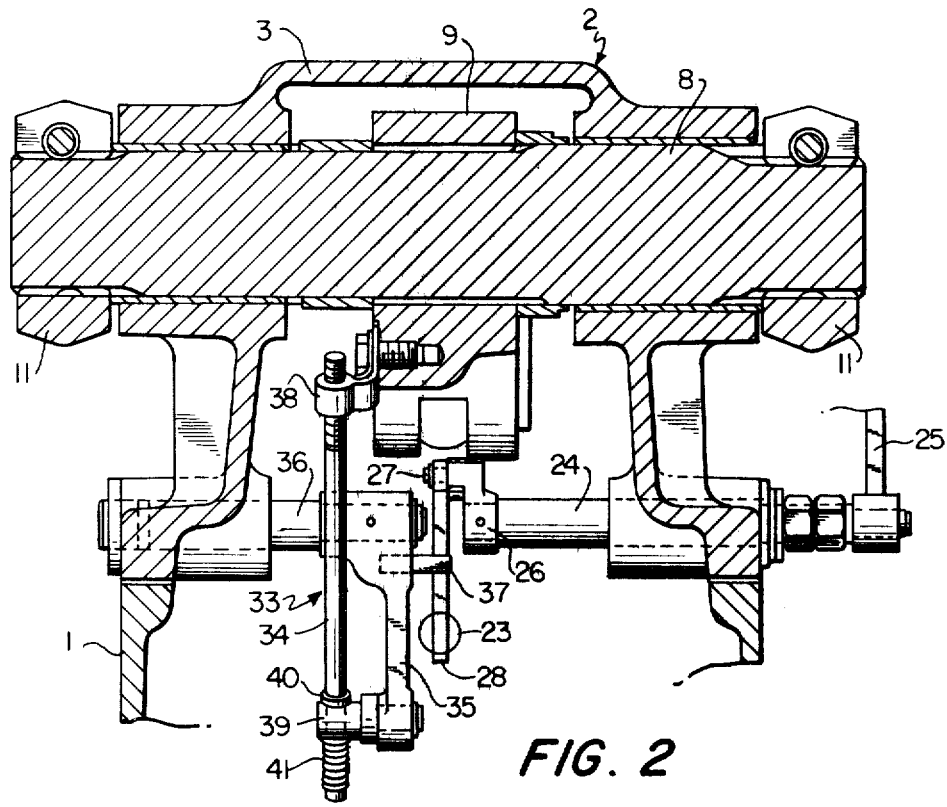
FIG. 2
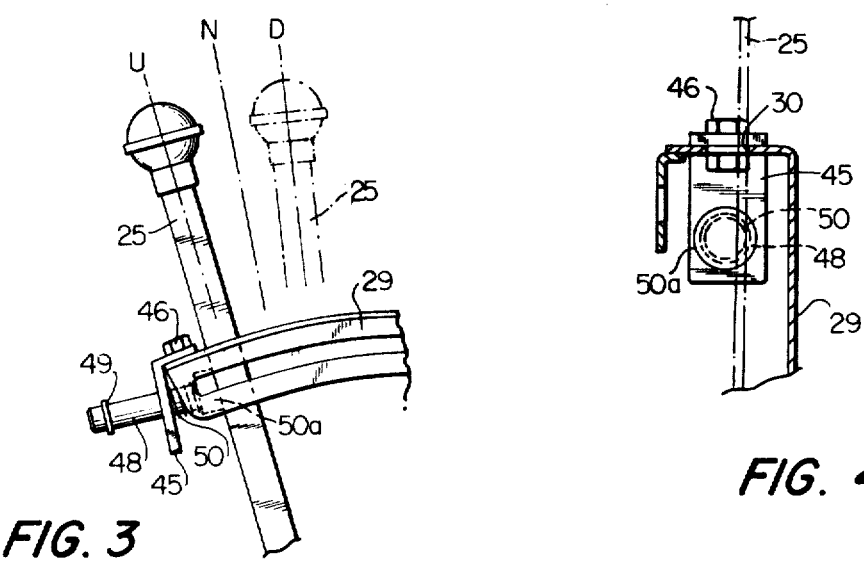
FIG. 3
FIG. 4

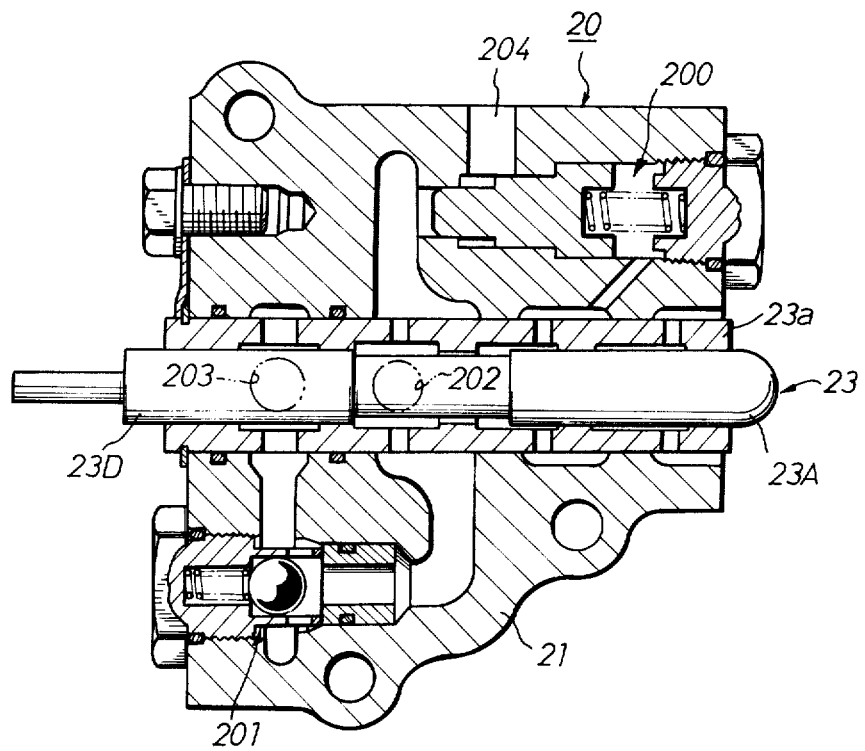
Fig. 9 (I)
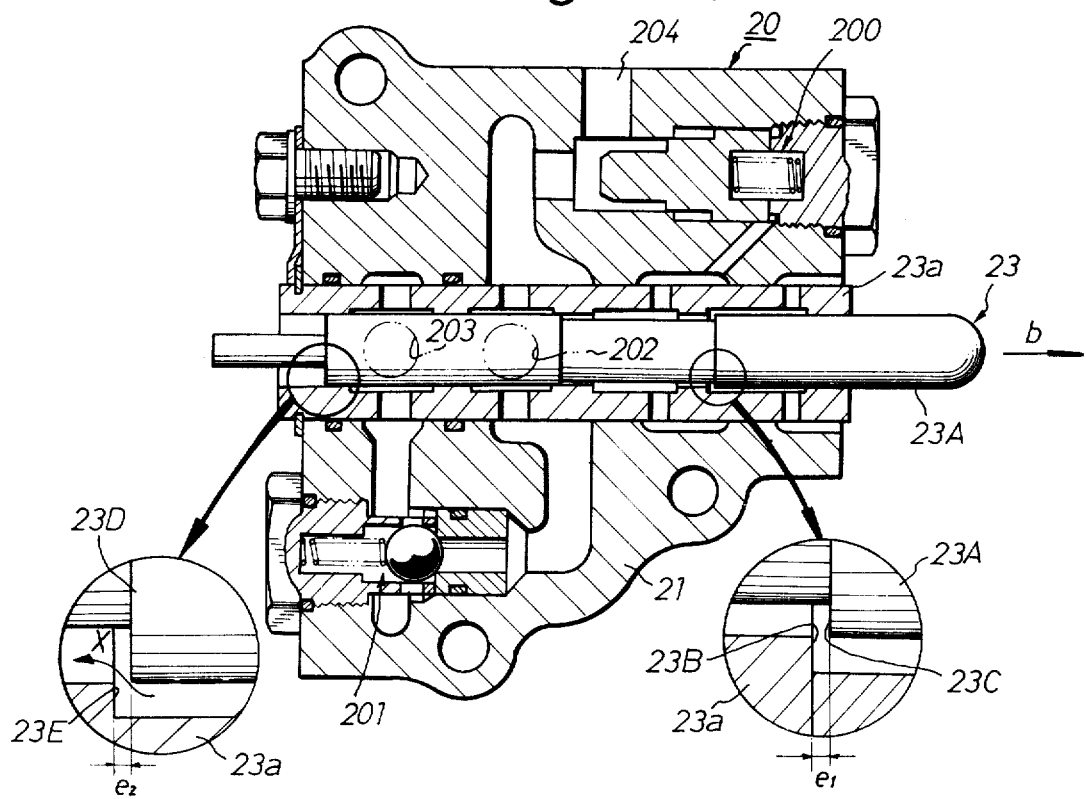
Fig. 9 (II)

HYDRAULIC CONTROL APPARATUS FOR TRACTOR

This application is a continuation-in-part of prior U.S. application Ser. No. 620,321, filed Oct. 7, 1975, now abandoned.

BACKGROUND OF THE INVENTION

This invention relates to a hydraulic control apparatus for tractors, and more particularly to an apparatus in which a position control valve provided for controlling a first hydraulic unit for lifting and lowering primary working implements is operable also for controlling a second hydraulic unit for lifting and lowering secondary working implements and which includes a control lever invariably and automatically returnable to its neutral position upon being released from the hand when the valve is used for controlling the second hydraulic unit.

Generally tractors incorporate a first hydraulic unit equipped with a position control valve for operating a rotary tiller unit, trencher or like primary working implement to be mounted on the rear portion of the tractor, such that the working implement is retainable at the desired level by the operation of the control valve. In addition, tractors are adapted for use with a secondary working implement such as a soil removing plate, front loader or the like to be attached to the front of the tractor which implement is operated by a second hydraulic unit. However, since the control valve is operable only for the first hydraulic unit for the primary working implement, the second hydraulic unit for the secondary working implement is usually controlled by an auxiliary control valve provided for the above-mentioned control valve or by another control valve independently provided. The additional control valve makes the overall construction complex, large and costly therefore.

To render the position control valve for the first unit usable also for the second hydraulic unit, a range for hydraulically operating the secondary working implement must be set on the guide plate for the control valve, but since the control valve is intended for position control, difficulties are encountered in determining the neutral position of the lever as well as in ensuring smooth operation of the primary working implement.

SUMMARY OF THE INVENTION

An object of this invention is to provide an improved hydraulic control apparatus in which a position control valve incorporated therein for controlling the first hydraulic unit for raising and lowering the primary working implement is serviceable also for controlling the second hydraulic unit for operating the secondary working implement without entailing the drawbacks and problems described above.

Another object of this invention is to provide an improved hydraulic control apparatus in which a position control valve for the first hydraulic unit is also operable for controlling the second hydraulic unit, the apparatus being equipped with a control lever therefore which is automatically and accurately returnable to its neutral position when released from the hand after it has been manipulated for operating the second hydraulic unit.

Still another object of this invention is to provide an apparatus which will not adversely affect the position control of the main working implement and which is easily employable for tractors incorporating an existing hydraulic control apparatus.

BRIEF DESCRIPTION OF THE DRAWINGS

FIG. 2 is a rear view partly broken away to show the same;

FIG. 3 is a fragmentary side elevation illustrating the operation of a control lever;

FIG. 4 is a sectional view of FIG. 3;

FIG. 9(I) and (II) are sectional views showing the interior structure of a control valve in detail, FIG. 9(I) showing the valve when lifting a working implement and FIG. 9(II) showing the same in its neutral position.

DESCRIPTION OF THE PREFERRED EMBODIMENTS

Figure 1:
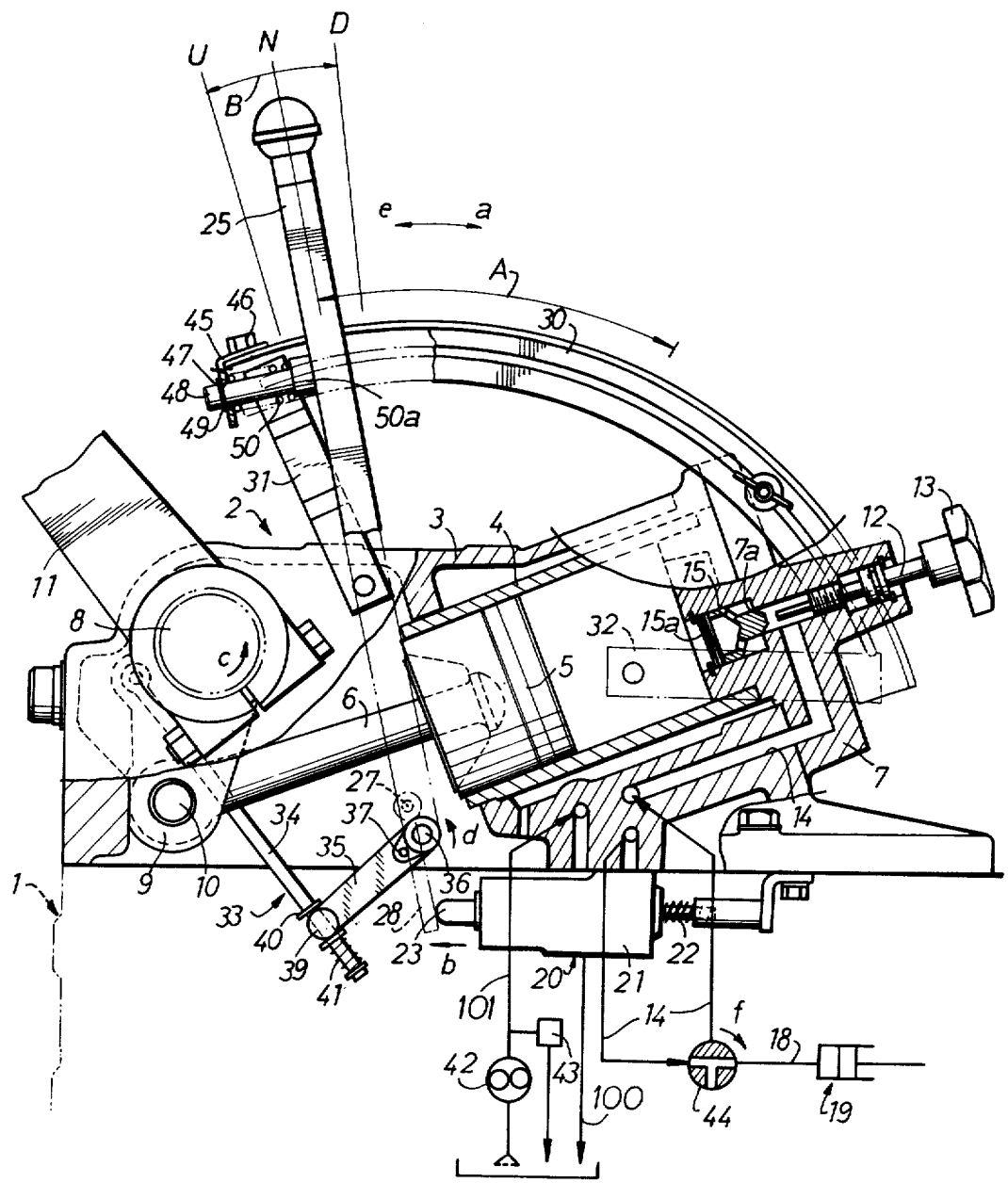
FIG. 1 is a side elevation showing the principal part of basic construction of this invention.

With reference to FIGS. 1 and 2, a transmission case 1 constitutes part of a tractor frame. Mounted on the top of rear portion of the case 1 is a first hydraulic unit 2 for lifting and lowering a rotary tiller unit, trencher or like primary working implement.

The first hydraulic unit 2 comprises a cylinder main body 3 fixedly mounted on the transmission case 1, a cylinder liner 4 disposed in the cylinder main body 3, a piston 5 slidably fitting in the liner 4, a piston rod 6 and a head end 7 fastened to the cylinder main body 3. The piston rod 6 has one end connected by a pin 10 to a hydraulic arm 9 fixed to a hydraulic arm shaft 8. The shaft 8 is supported by the opposite side walls of the cylinder main body 3 rotatable about its own axis. As seen in FIG. 2, a pair of lift arms 11 and 11 are fixed to the opposite projecting ends of the shaft 8. The free ends of the arms 11 and 11 extend backward.

A dropping speed controlling rod 12 has a knob 13 at its one end and is movable in the head end 7 in screw-thread engagement therewith to regulate the throttling degree of a check valve 15 (see FIG. 7) provided in an oil passage 14 extending from a control valve 20 to the cylinder liner 4. The check valve 15 is biased by a spring 15a against a seat face 7a on the head end 7, whereby working oil can be held enclosed in the cylinder liner 4. To render the working oil releasable from the cylinder liner 4, the knob 13 is turned, advancing the controlling rod 12 toward the check valve 15 and thereby moving the valve 15 away from the seat face 7a against the spring 15a. With the embodiment shown in FIG. 1, the oil passage 14 between the control valve 20 and the check valve 15 is provided with a three-way switch valve 44, through which and via a duct 18 the pressurized oil can be fed to a second hydraulic unit 19 for lifting and lowering a soil removing plate, front loader or like secondary working implement. Further with another embodiment shown in FIG. 5, the head end 7 has an oil outlet 16 in which a plug 17 is detachably mounted. Through the plug 17 and a duct 18, pressurized oil can be supplied to a second hydraulic unit 19 for lifting and lowering a soil removing plate, front loader or like secondary working implement.

The control valve 20 is housed in a valve case 21 mounted by bolts or the like on the inner lower side of the cylinder main body 3. The valve case 21 is provided with a spool 23 which is slidable longitudinally of the tractor frame and is urged by an elastic member 22 in a descending direction.

FIG. 9(I)(II) show a valve case 21 and a spool 23 fitted in the valve case 21 as slidably inserted in a sleeve 23a. The valve case 21 further includes a discharge valve 200, a check valve 201, a pump port 202, a cylinder port 203, and a tank port 204. Hydraulic press oil is forced out from a hydraulic pump 42 illustrated in FIG. 1 and FIG. 5, and is introduced into the valve case 21 through the passage 101 and the pump port 202.

When the lift arms 11 and 11 are to be raised, the spool 23 is brought to the position of FIG. 9(I), with the discharge valve 200 closed and the check valve 201 opened, so that oil from the pump port 220 flows through the cylinder port 203 and the passage 14 to exert back pressure on the piston 5 fitted in the cylinder liner 4. When the lift arms 11 and 11 are to be brought to a halt, the spool 23 is positioned as illustrated in FIG. 9(II) to open the discharge valve 200, through which the oil from the pump port 202 is returned to a tank by way from the tank port 204 to the drain passage 100 shown in FIG. 1 and FIG. 5. More specifically stated, when the lift arms 11 and 11 are to be raised, the spool 23 is closed by the cooperation of a plunger portion 23A and the edge portion 23B of the sleeve 23a. The oil forced into the pump port 202 flows to the discharge valve 200, applying back pressure to the discharge valve 200 to close the valve 200, whereby the return flow of oil to the tank port 204 is interrupted. Subsequently, the pressure of inflowing oil, when exceeding a given level, opens the check valve 201 and applies pressure to the piston 5 of the first hydraulic unit 2. When the lift arms are to be brought to a stop, the oil imparting back pressure to the discharge valve 200 is released through the clearance el between the edge 23B of the sleeve 23a and the edge 23C of the spool 23 to open the discharge valve 200. Oil therefore flows back through the tank port 204.

A control lever shaft 24 shown in FIG. 2 extends, in parallel to the shaft 8, through the right wall of the cylinder main body 3 and is rotatable about its own axis. The control lever rod 24 has an outer end to which the base end of a control lever 25 is fixed and an inner end provided with an arm 26 carrying an eccentric pin 27 positioned in parallel to the shaft 24. Extending downward from the eccentric pin 27 is a pivotable spool lever 28 in contact with the rear end of the spool 23.

The control lever 25 substantially made of a spring plate is in elastic contact with a grooved portion 30 of a guide plate 29 as shown in FIG. 4. The guide plate 29 is longitudinally circular arc and is supported by a pair of stays 31 and 32 secured to the right side wall of the cylinder main body 3.

A feedback mechanism 33 comprises a feedback rod 34, a feedback lever 35, a lever shaft 36, feedback pin 37, etc. The feedback rod 34 has one end connected by a connector 38 to the hydraulic arm 9 pivotably relative to each other and the other end having a connecting pin 39 interposed between a stopper 40 and an elastic member 41. The feedback lever 35 has one end connected to the feedback rod 34 by the pin 39 and the other end supported by the inner end of the lever shaft 36. The feedback pin 37 positioned slightly away from the lever shaft 36 toward the connecting pin 39 is fixed to the feedback lever 35. At a position between the eccentric pin 27 and the spool 23, the feedback pin 37 bears against the rear side of the spool lever 28. The lever shaft 36 is supported by the left side wall of the cylinder main body 3 and is coaxial with the control lever shaft 24 in opposing relation thereto.

The present apparatus further includes a hydraulic pump 42, a relief valve 43 provided in the oil passage 101 and a switch valve 44 for feeding the working oil from the control valve 20 to the first hydraulic unit 2 or the second hydraulic unit 19 selectively or alternatively.

As will be apparent from FIG. 1, the guide plate 29 provides a first operation range A for the position control lever 25 to control the first hydraulic unit 2 for a primary working implement and a second operation range B at the center of which is located the position N of the lever 25 corresponding to a maximum lift position for the working implement. The second operation range B is provided for the second hydraulic unit 19 for a secondary working implement. The second operation range B includes a neutral position at the above-mentioned position N and both a raising or upward position U and a lowering or downward position D. The upward position U itself defines a range for giving the hydraulic pressure for raising the secondary working implement. The guide plate 29 is provided at its one end with the following mechanism for accurately positioning the lever 25 at the neutral position N and for automatically returning the lever 25 to the neutral position after it has been shifted to the upward position U.

With reference to FIG. 1, a fixing member 45 for example in an inverted L-shape is fastened to one end of the guide plate 29 by a bolt and nut 46 or the like. The fixing member 45 has a bore 47. A guide rod 48 has one end extending through the bore 47 and the other end to be brought into abutting contact with an intermediate portion of the control lever 25. The rod 48 is fixedly provided with a regulating pin 49 adapted for bearing contact with the outer surface of the fixing member 45. A return spring 50 such as a coiled spring is mounted on the guide rod 48 between the fixing member 45 and a head 50a of the guide rod 48 bearing contact with the lever 25 to automatically return the lever 25 from the upward position U of the second operation range B to the neutral position N. The regulating pin 49, when brought into bearing contact with the outer surface of the fixing member 45, enables the lever 25 to be set accurately in the neutral position.

Although the control lever 25 is shifted against the force of the spring 50, the head 50a having a larger diameter than the bore 47 prevents the guide rod 48 from escaping from the bore 47.

Figure 5:
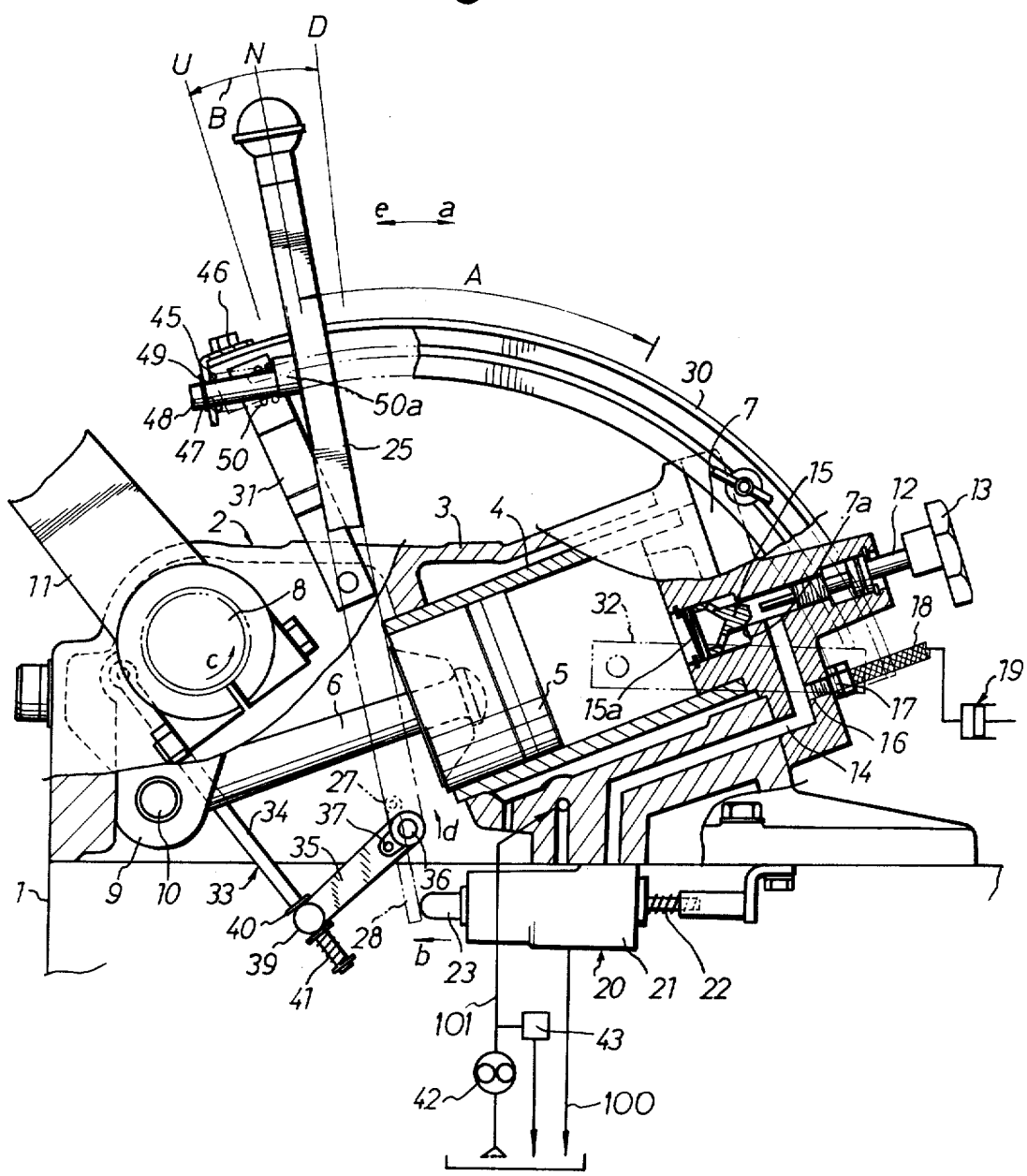
FIG. 5 is a side elevation partly in section showing a working oil outlet.

As seen in FIG. 1 and 5, the pump 42, which is driven by the tractor engine, continues its pumping operation at all times while the engine is in operation, feeding the hydraulic oil to a control valve 20 through the oil passage 101. The control valve 20 is provided between the oil passage 101 and the oil passage 14 in the cylinder. In the structure of FIG. 1, a switch valve 44 is provided in the oil passage 14, whereas the construction of FIG. 5 does not include this valve 44. When the control lever 25 in FIG. 1 is shifted in the direction of the arrow e, the switch valve 44 is so changed over (rotated 90° in the direction of arrow F in FIG. 1) that the entire length of the oil passage 14 communicates with the interior of the cylinder liner 4 of the first hydraulic means 2, the spool 23 of the control valve 20 slidingly moves against the spring 22 in the direction opposite to the direction of the arrow b, with the result that the hydraulic oil is fed by the pump 42 to the piston 5, by way of a check valve 15 provided in the oil passage 14 in the cylinder head 7, the check valve 15 being operable by the dropping speed controlling rod 12. During the operation of the pump 42, an excess of the hydraulic oil flows into the tank through a relief valve 43 in communication with the oil passage 101, thereby permitting a constant pressure to act on the piston 5.

Thus, the lift arms 11 and 11 can be pivotally raised by shifting the control lever 25 in the direction of the arrow e. To lower the lift arms 11 and 11 from their raised position, the oil confined within the cylinder liner 4 by the check valve 15 must be released therefrom. For this purpose, the control lever 25 is shifted in the direction of the arrow a, causing the spring 22 to move the spool 23 in the direction of arrow b, shown in FIGS. 1, 5 and 9(II). The knob 13 is turned about the axis of the controlling rod 12 to thereby advance the controlling rod 12 toward the check valve 15 and open the check valve 15 which is biased in the closed direction at all times. The primary working implement such as a rotary tiller unit, suspended from the lift arms 11 and 11 acts under gravity on the piston 5 via the piston rod 6, causing the hydraulic oil to flow out from the interior of the cylinder liner 4 through the check valve 15, oil passage 14, the clearance e2 between the plunger portion 23D and the edge portion 23E as directed the arrow x in FIG. 9(II) and through the drain circuit 100 as shown in FIGS. 1 and 5 and return to the tank. Then despite the operation of the pump 42, the oil forced out from the pump returns to the tank through the tank port 204 shown in FIG. 9(II).

FIG. 1 shows the mechanism when a primary working implement is in its maximum lift position, with the spool 23 in its neutral position. If the position control lever 25 in this state is shifted in the direction of arrow a in FIG. 1 to lower the working implement, the spool 23 is moved in the direction of arrow b by the elastic member 22, switching the position control valve 20 to the drain position, and if the controlling rod 12 is advanced toward the check valve 15 and open the check valve 15, the oil confined within the cylinder liner 4 is released to permit the primary working implement to descend under gravity. At this time, the switch valve 44 has been set for the first hydraulic unit 2, and the hydraulic arm 9 turns in the direction of arrow c, turning the lever 35 of the feedback mechanism 33 in the direction of arrow d about the lever shaft 36 and thereby pushing the spool lever 28 backward in the direction of arrow d. Accordingly, when the lever 25 is set in a specified position of the grooved portion 30, the spool 23 is moved in the opposite direction to the direction of arrow b to return the control valve 20 to its neutral position. In this state, the hydraulic circuit of the first hydraulic unit 2 is locked. The primary working implement can be raised to the desired controlled position by shifting the control lever 25 in the direction of arrow e and the control valve 20 is returned to its neutral position.

To operate a secondary implement using the secondary hydraulic unit 19, the control lever 25 is shifted in the direction of arrow e to the neutral position N, whereby while the primary working implement is being raised to the maximum lift position, the control valve 20 is returned to is neutral position. Thereafter, the switch valve 44 is operated by rotating it so it is aligned as shown in FIG. 1 to lock the hydraulic circuit of the primary hydraulic unit 2, and the control valve 20 is switched for the operation of the secondary hydraulic unit 19. Subsequently to raise the secondary working implement, the control lever 25 is pushed in the direction of arrow e to the upward position U in the second operation range B, against the action of the return spring 50 on the guide rod 48 as indicated by the solid line in FIG. 3. Since the feedback pin 37 at this time is in completely fixed state as shown in FIG. 1, the spool lever 28 pushes the spool 23, switching the control valve 20 to the raising operation, with the result that the working oil is supplied from the hydraulic pump 42 to the second hydraulic unit 19.

When the second hydraulic unit 19 has completely raised the secondary working implement (not shown), the relief valve 43 starts to operate. Upon the control lever 25 being relieved of the operating force, the lever 25 is automatically returned from the upward position U to the neutral position N by the action of the return spring 50 and is held stationary accurately at the neutral position by the regulating pin 49. In operative relation to this, the spool 23 moves back to the position of FIG. 1, and the control valve 20 to its neutral position. The secondary working implement is lowered by manually shifting the control lever 25 from the neutral position N to the downward position D as indicated in the phantom line in FIG. 3.

Further in the case of the other embodiment shown in FIG. 5, the pressurized oil from the pump 42 is passed through the passage 101, then through the control valve 20 and thereafter through the passage 14 and opens the check valve 15 against the spring 15a, flowing into the cylinder liner 4, whereby the piston 5 is slidingly advanced to raise the lift arms 11 in the same manner as already described. After the cylinder liner 4 has been filled with the oil, the oil from the pump 42 is forced into the second hydraulic unit 19 by way of the oil outlet 16 and the duct 18. The oil filling the cylinder liner 4 is held confined therein by the check valve 15.

The control lever 25 is then shifted toward the position U or D from the neutral position N shown in FIG. 5. This causes the second hydraulic unit 19 to perform a lifting or lowering operation under the control of the control valve 20 in the same manner as in the first embodiment.

Figure 6:
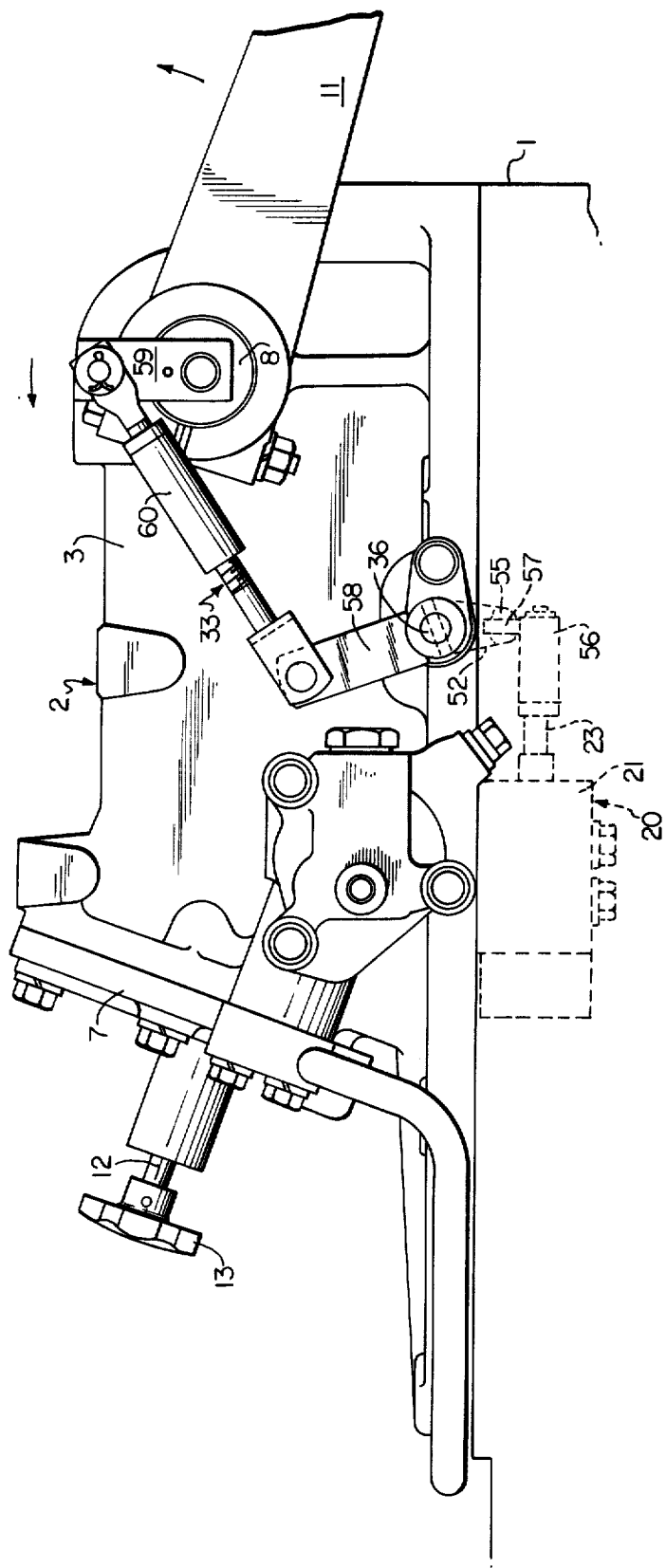
FIG. 6 is a side elevation showing another embodiment of feedback mechanism.
Figure 7:
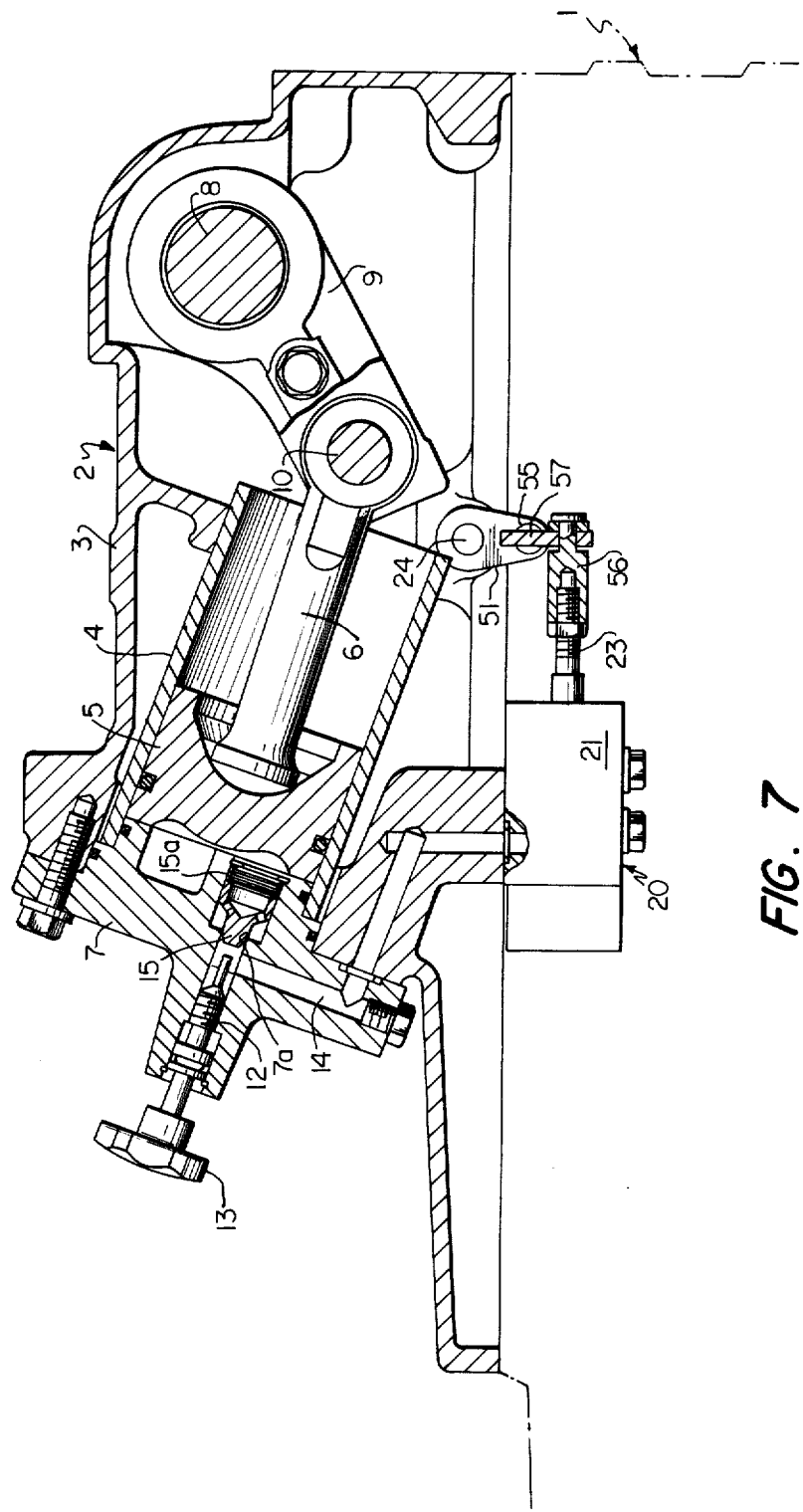
FIG. 7 is a sectional side elevation of FIG. 6.
Figure 8:
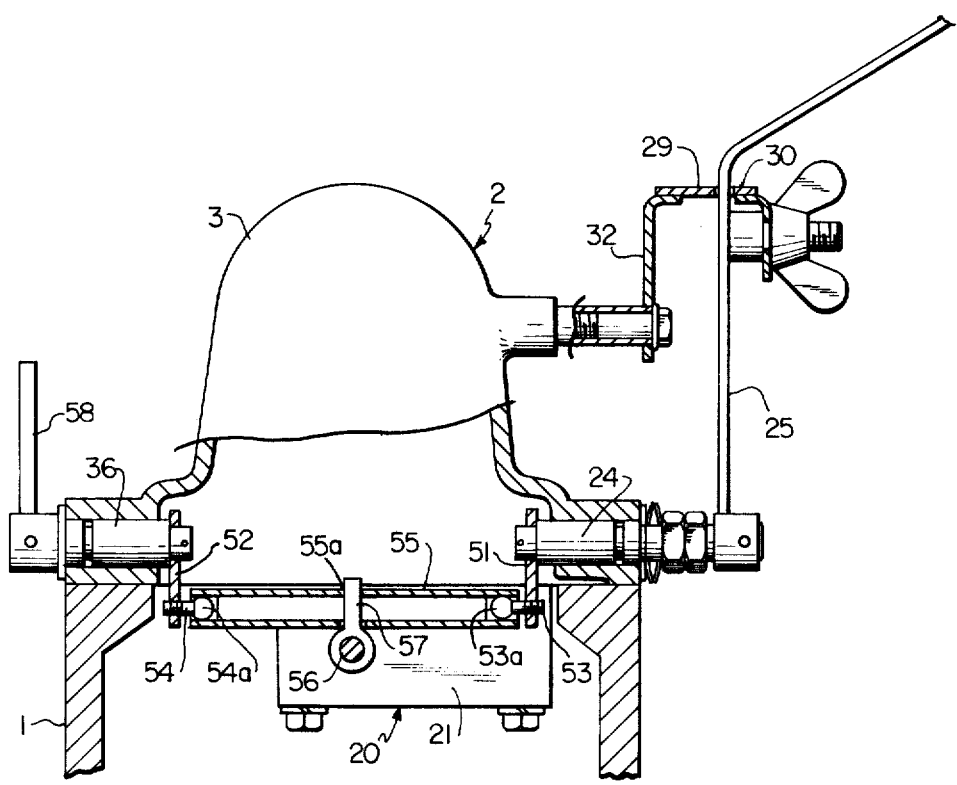
FIG. 8 is a cross sectional view of FIG. 6 showing the principal part.

FIGS. 6 to 8 show a link mechanism which assures the operation of the spool of the control valve for lifting and lowering actions and a feedback mechanism provided externally of the apparatus. The embodiment of FIGS. 6 to 8 includes the same means as in the foregoing embodiment for returning the control lever 25 to its neutral position, so that the returning means will not be described.

As seen in FIG. 8, a control lever shaft 24 and a feedback lever shaft 36 as opposed to each other are supported by a hydraulic main body 3. Crank plates 51 and 52 are fixed to the inner ends of the lever shafts 24 and 36 respectively. Inwardly projecting pin members 53 and 54 are mounted on the crank plates 51 and 52 eccentrically with respect to the lever shafts 24 and 36. Spherical joint portions 53a and 54a are provided at the ends of the pin members 53 and 54. A spool operating bar 55 extending between and supported by the pair of spherical joint portions 53a and 54a is formed with a diametrical pin bore 55a approximately at its midportion.

As shown in FIG. 7, a connector 56 screwed on the projecting end of a spool 23 has a pin portion of a reduced diameter loosely fitting in and supporting an actuating lever 57. The actuating lever 57 has a pin portion inserted in the pin bore 55a in the spool operating bar 55.

Referring to FIG. 6, a connector 58 is fixed to the outer end of the feedback lever shaft 36, while a connector 59 is fixed to the outer end of a hydraulic arm shaft 8. Both the connectors 58 and 59 are interconnected by a feedback rod 60 of the turnbuckle type.

The embodiment of FIGS. 6 to 8 operates as follows. When the piston 5 is positioned at the top dead center as seen in FIG. 7, the pair of lift arms 11 fixedly mounted on the hydraulic arm shaft 8 are in their lowered position as illustrated in FIG. 6. When the control lever 25 is shifted in the direction e for lifting, the control lever shaft 24 secured to the lower end of the lever 25 rotates in a clockwise direction in FIG. 7.

Because the lever shaft 24 is fixedly provided with the crank plate 51 having the pin member 53 whose spherical joint portion 53a freely fits in one end of the spool operating bar 55, the pin member 53, like the control lever 25, turns in a clockwise direction. It is noted that one end of the spool 23 is freely movably connected to the midportion of the spool operating bar 55 by means of the actuating lever 57 and connector 56, whilst the other end of the spool operating bar 55 is freely movably connected to the pin member 54 which is connected to the feedback shaft 36 eccentrically thereof. Consequently, the above movement of the pin member 53 slidingly moves the spool 23 in the direction of the arrow of FIG. 7 through the operating bar 55 and actuating lever 57 to effect a fluid flow for lifting operation. Although the movement of the pin member 53 tends to rotate the feedback lever shaft 36 through the crank plate 52, the torque to be delivered to the crank plate 52 is absorbed at the portion where the spherical joint portion 54a is freely movable fitted in the bar 55 moves as supported at a fixed point by the spherical joint portion 54a, forcing the spool 23 in the direction of the arrow. Furthermore the pin bore 55a is so designed as to satisfactorily permit the actuating lever 57 to follow this movement without the possible disengagement of the pin portion from the bore 55a during the pivotal movement of the crank plate 51 about the lever shaft 24. When the control valve 20 is switched as above, the working oil acts on the front of the piston 5, causing the piston 5 to slide along toward the bottom dead center within the liner 4. The sliding movement of the piston 5 is delivered to the piston rod 6 and then to the hydraulic arm 9, etc. to pivotally raise the pair of lift arms 11 about the hydraulic arm shaft 8.

When the lift arms 11 are raised, the connector 59 fixed to the arm shaft 8 turns in the direction of the arrow in FIG. 6. This movement is delivered through the feedback lever shaft 36 to rotate in a counterclockwise direction in FIG. 6. Because the eccentric pin member 54 on the crank plate 52 mounted on the inner end of the shaft 36 is freely movably connected to the spool operating bar 55 by the spherical joint portion 54a, the counterclockwise rotation of the feedback lever shaft 36 acts to automatically return the spool 23 to the original position. At this time, the bar 55 moves as supported at a fixed position where the bar 55 is freely movably connected to the spherical joint portion 53a to automatically return the spool 23 to its neutral position which spool is freely movably connected to the midportion of the bar 55, whereupon the piston 5 comes to a halt.

The piston will be forced up by an operation reverse to the above. When the control lever shaft 24 is driven in a counterclockwise direction, the spool is withdrawn in the opposite direction to the arrow by the spool operating bar 55 which is moved about a fixed position where the bar 55 is freely movably connected to the feedback lever shaft 36. This causes the working oil in front of the piston to be run off into the hydraulic circuit, permitting the gravity acting on the lift arms 11 to force up the piston 5. The downward pivotal movement of the lift arms 11 is delivered through the feedback mechanism 33 to the feedback lever shaft 36 to cause the bar 55 to move about a fixed position where it is idly movably connected to the control lever shaft 24. The spool 23 is returned to the original neutral position.

What is claimed is:

1. A hydraulic control apparatus comprising a first hydraulic unit for raising and lowering a primary working implement, a second hydraulic unit for raising and lowering a secondary working implement, a control valve for controlling the first hydraulic unit, a control lever for operating the control valve, a guide plate for guiding the control lever and a feedback mechanism for returning the control valve to a neutral position for every position of the control lever in operative relation to the upward or downward movement of the primary working implement, the guide plate providing a first operation range for the primary working implement and a second operation range for the secondary working implement, the control lever having a neutral position corresponding to a maximum lift position of the control lever for the primary working implement, the guide plate being provided with elastic regulating means for the second operation range to set the control lever in the neutral position, an oil passage extending from the control valve to the first hydraulic unit and being provided with means for holding the first hydraulic unit filled with oil, the second hydraulic unit being controllable through the control valve by the operation of the control lever within the second operation range while the first hydraulic unit is in a locked state, the control lever being automatically returnable to the neutral position for the secondary working element by the restoring action of the elastic regulating means when operated in a direction against the elastic regulating means.

2. A hydraulic control apparatus as defined in claim 1 wherein the elastic regulating means provided for the second operation range comprises a fixing member secured to an end portion of the guide plate and having bore, a guide rod movably inserted in the bore of the fixing member, a return spring mounted on the guide rod and a regulating pin attached to the guide rod, the control lever being automatically returnable to the neutral position for the secondary working implement by the restoring action of the return spring when operated against the action of the spring, the control lever being settable in the neutral position by the regulating pin coming into bearing contact with the fixing member.

3. A hydraulic control apparatus as defined in claim 1 wherein a working oil outlet for the second hydraulic unit is provided at an intermediate portion of the oil passage extending from the control valve to the first hydraulic unit, the oil outlet being hydraulically in communication with the second hydraulic unit.

* * * * *